May 12, 1970   I. O. MINER   3,511,474
BUTTERFLY VALVE
Filed Dec. 27, 1967   6 Sheets-Sheet 1
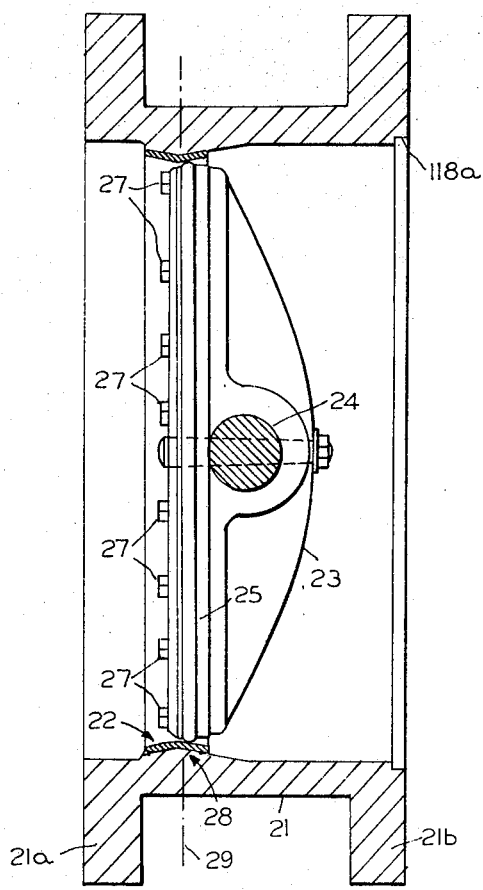
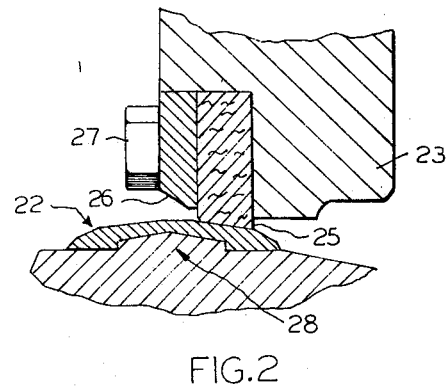
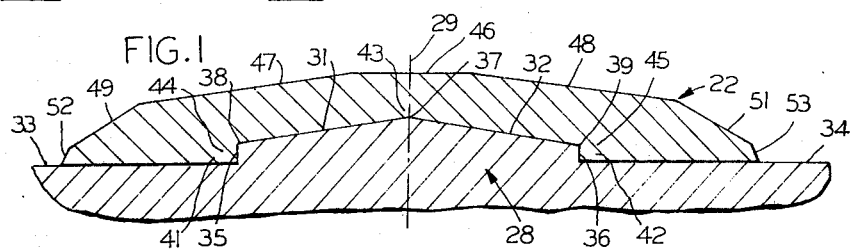
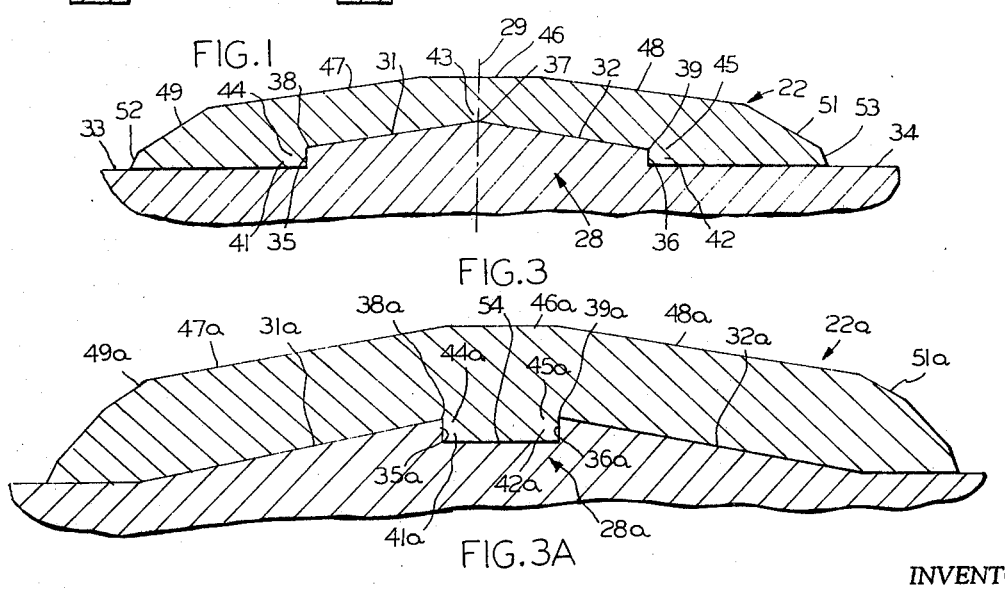
INVENTOR
IRVING O. MINER
BY   *Dodge and Sons*
ATTORNEYS May 12, 1970 — I. O. MINER — 3,511,474
BUTTERFLY VALVE
Filed Dec. 27, 1967 — 6 Sheets-Sheet 2

INVENTOR
IRVING O. MINER
BY Dodge and Sons
ATTORNEYS

INVENTOR
IRVING O. MINER

Dodge and Sons

ATTORNEYS

May 12, 1970      I. O. MINER      3,511,474

BUTTERFLY VALVE

Filed Dec. 27, 1967      6 Sheets-Sheet 6

INVENTOR
IRVING O. MINER

BY    Dodge and Son

ATTORNEYS

United States Patent Office 3,511,474
Patented May 12, 1970

3,511,474
BUTTERFLY VALVE
Irving O. Miner, Warwick, R.I., assignor to General Signal Corporation, a corporation of New York
Filed Dec. 27, 1967, Ser. No. 693,845
Int. Cl. F16k *1/22;* B21b *53/10, 39/10*
U.S. Cl. 251—305        6 Claims

ABSTRACT OF THE DISCLOSURE

A butterfly valve having a work-hardened, corrosion resistant metal seat insert in the body and a disc which carries the cooperating resilient valving element. The seat is under compressive stress in both the radial and circumferential directions, and has integral keying portions which cooperate with annular shoulders in the body to prevent its axial displacement, and portions which are tightly compressed against continuous sharp edges at the margins of said shoulders and act as water stops. The seat is made from a ring of rectangular cross section which is expanded into place in the body and simultaneously shaped by revolving forming rollers.

CROSS-REFERENCE TO RELATED APPLICATIONS

The process and machine disclosed herein are claimed in co-pending applications Ser. No. 839,118, field May 1, 1969, and Ser. No. 839,119, filed May 1, 1969, respectively.

BACKGROUND AND SUMMARY OF THE INVENTION

This invention relates to an improved butterfly valve and to a process and machine for manufacturing same.

The common form of butterfly valve used today in water and chemical distribution systems employs a molded body seat made of rubber or like resilient material, and a cooperating, pivoted disc made of corrosion resistant metal. Although this type of valve is satisfactory from the performance standpoint, it is expensive because of the relatively high cost of making the molded body seat, and also because of the necessity for fabricating the entire disc from a special, expensive alloy. Furthermore, at best it is very difficult to adjust this type of valve to eliminate leakage which might result from tolerance accumulations or slight manufacturing errors, and the molded seat cannot be replaced in the field without special equipment which must usually be obtained from the valve manufacturer.

One object of this invention is to provide an improved butterfly valve which is less expensive to make and much easier to adjust than the one just mentioned, which permits easy replacement of the resilient valving member in the field, and which affords superior resistance to corrosion and to the adverse effects of hydraulic and cavitation forces. According to the invention, the resilient valving member is clamped in place on the disc, and the body seat is an insert made of a corrosion resistant metal. The new valve is characterized by the following main structural features:

(1) The body has an annular seat-receiving portion which includes a pair of annular shoulders that terminate at continuous sharp edges that encircle the body axis, (2) The seat insert is work-hardened and is under substantial compressive loading in both the radial and circumferential directions, (3) The insert has integral keying portions which cooperate with the body shoulders to hold it against axial displacement under the action of hydraulic loads encountered in service, and (4) The insert includes regions which are tightly compressed against the sharp body edges and which define water stops that prevent leakage between the mating surfaces of the body and the insert.

Since the seat insert in this valve is the metal valving element, the disc can be made of cast iron. This change from the conventional valve effects substantial savings in the cost of materials. Further savings are effected by reason of the fact that the resilient valving member can bee made from a strip of rubber and need not be molded specially. Moreover, since the rubber member is clamped to the disc, and thus is accessible, manufacturing inaccuracies can be compensated easily merely by increasing the clamping force and causing the rubber to extrude at selected points around the circumference of the disc. Finally, since the seat insert is work-hardened and subjected to substantial compressive loading, it is highly resistant to both cavitation damage and corrosion.

The invention also provides a novel process and machine for fabricating the seat insert. According to this aspect of the invention, the seat is made from a metal ring of rectangular cross section which is expanded into place on the seat-receiving portion of the body and simultaneously shaped and finished. This is a cold working operation and is carried out by forming rollers which are revolved about the axis of the valve body. The machine allows the metal in the ring to expand or extrude in the axial direction, but, during the initial stage of the process, the ring is restrained against axial displacement in either direction from the desired location. After deformation of the ring has proceeded to the point where the ring is self-retaining, the centering bias is removed. The forming process is then continued until the final seat shape has been produced.

The preferred forming machine incorporates adjustment features which enable it to handle many of the valve sizes used in the watere distribution industry, i.e., bodies having diameters of 24″, 30″, 36″, 42″, 48″, 54″, 60″, 66″ and 72″, with a maximum number of common parts. It includes three forming rollers which are pressed outward against the seat ring by rams supplied from an air operated hydraulic pump which is carried by the rotating structure. This design minimizes the effects of eccentricity between the valve body and the rotational axis of the machine, and eliminates the need for high pressure, rotary hydraulic seals. The centering bias needed at the start of the forming operation is supplied by six sets of spring loaded guide rolls. The machine includes easily manipulated mcehanisms for relieving the spring load and retracting the guide rollers when they are not needed. Other, more detailed feautres of the machine will be mentioned later in connection with the description of the preferred embodiment.

BRIEF DESCRIPTION OF THE DRAWINGS

The preferred embodiment of the invention is described herein with reference to the accompanying drawings in which:

FIG. 1 is a cross sectional view of one version of the improved butterfly valve.

FIG. 2 is an enlargement of the seat portion of the valve shown in FIG. 1.

FIGS. 3 and 3A are enlarged sectional views through two versions of the seat insert.

Figure 4:
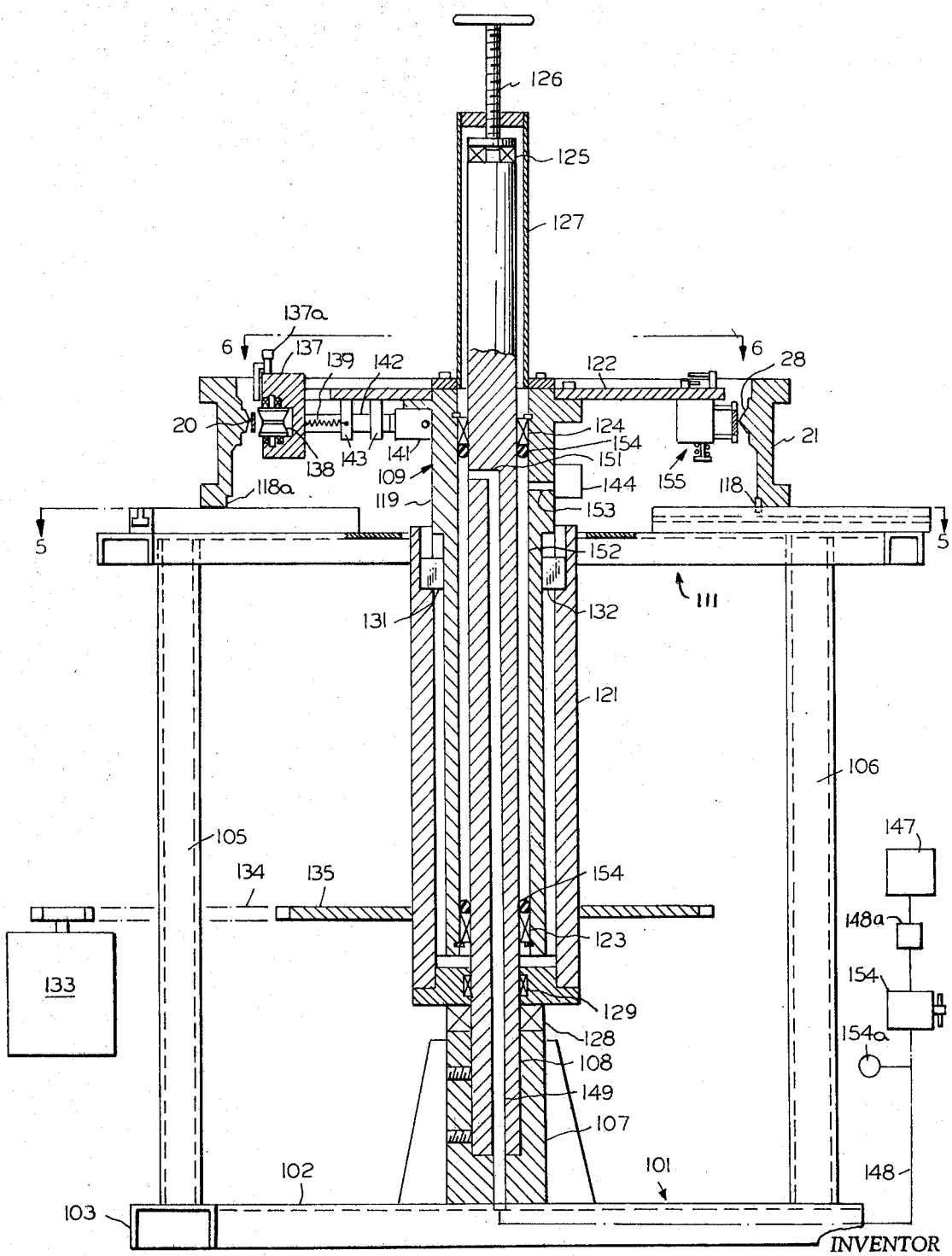
FIG. 4 is a diagrammatic elevational view, partly in section, of the preferred forming machine.
Figure 5:
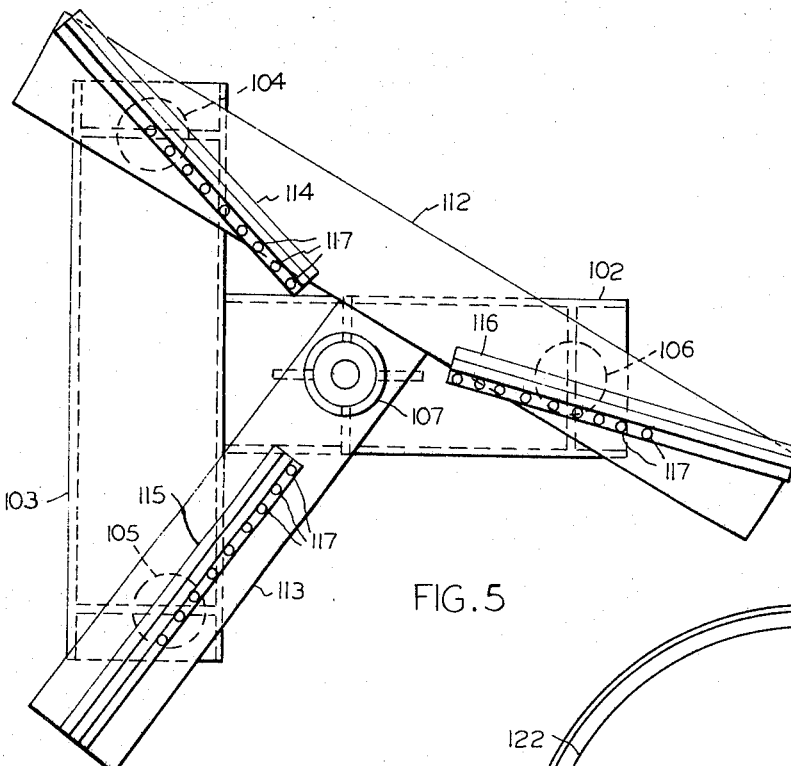
FIGS. 5 and 6 are sectional views, on reduced scale, taken on lines 5—5 and 6—6, respectively, of FIG. 4.

DESCRIPTION OF THE PREFERRED EMBODIMENT (A) The valve

The improved butterfly valve shown in FIGS. 1–3 includes a cylindrical metal body 21 in which is fixed a seat insert 22 made of a corrosion resistant metal, and a metal disc 23 which is mounted for pivoting movement about the axis of trunnions 24. Commonly, body 21 and disc 23 are made of cast iron; however, the body may be made of ductile or nodular iron, or steel, and the disc may be made of Ni-resist. The disc 23 carries an annular, resilient valving element 25 formed from a strip of rubber which is held in place by a clamping ring 26 and a circular series of spaced bolts 27 which pass through the ring and the rubber strip and are threaded into the disc. The degree of compression of the rubber element depends upon the torque applied to bolts 27 and can be changed as required either to alter the torque required to move the disc or to provide desired liquid-tightness by advancing or retracting selected bolts.

Seat insert 22, which usually is made from type 304L stainless steel, but can also be made from other materials, such as monel or bronze, fits tightly against an annular seat-receiving portion 28 of body 21. Portion 28 is symmetrical with with respect to a plane 29 normal to the body axis and includes a pair of intersecting conical surfaces 31 and 32, a pair of cylindrical surfaces 33 and 34, and a pair of intermediate annular shoulders 35 and 36. The junctions between the conical surfaces 31 and 32, and between these surfaces and the annular shoulders, define continuous edges 37, 38 and 39 which encircle the body axis. These edges are founded on a radius on the order of 0.005″, and thus are considered sharp. The insert 22, which is work-hardened, is under substantial compressive loading in both the radial and circumferential directions and is provided with integral portions 41 and 42 which cooperate with shoulders 35 and 36 to key it against axial displacement under the action of the hydraulic loads encountered in service. The insert 22 also has regions 43, 44 and 45 which are tightly compressed against edges 37–39, respectively, and which serve as water stops that preclude leakage along the interface between the insert and the body 21.

It should be noted that the peaked roof shape of the seat-receiving portion is preferred over such posible alternatives as a cylindrical shape because it tends to minimize both the quantity of stainless steel and the amount of cold working required to make seat 22. The first saving is important because steel work-hardens quickly and cannot be annealed once the seat-rolling process commences.

The inner peripheral surface of seat insert 22 is symmetrical about plane 29 and includes a central cylindrical surface 46 and conical surfaces 47, 48, 49, 51, 52 and 53. Surface 48 defines the seat for resilient valving element 25, and theoretically it should extend axially far enough to insure that the resilient element would not cross an edge as it moves onto and off of the seat. However, in such a design, the insert would be so long that it would have to contain cutouts for trunnions 24, and could even cause the laying length of the valve, i.e., the distance between body flanges 21a and 21b, to exceed the specifications of the American Water Works Association (AWWA). In the illustrated design, insert and body length are kept within tolerable limits, and sharp edges are avoided, by using the lead-in cones 47 and 51 and the cylindrical surface 46. The symmetrical design of the insert is a desirable feature because it eliminates unbalanced axial loads on the machine used to form the seat.

The resilient valving element 25 is offset from the axis of trunnion 24, and, if the rubber remained compressed as the disc pivoted away from the closed position shown in FIG. 1, the outer margin of the element would trace a sphere centered at the point of intersection of the trunnion and body axes. Conical surface 48 is coaxial with body 21, and its conical angle is so chosen that the surface and the aforementioned imaginary sphere are approximately tangent. With this arrangeemnt the maximum degree of interference between the seat insert and the resilient element occurs when the disc 23 is normal to the body axis, and the interference decreases all around the circumference of the seat as the valve is opened. AWWA standard C504 includes six classes of valve for each disc size and, for optimum performance, a different angle for conical surface 48 would have to be used for each one. Furthermore, since the ratio of the diameter of trunnions 24 to the diameter of the valve is not constant, changes in line size would also necessitate alteration of the seat insert if perfect geometry were to be afforded. Because of the type of process I use to form the seat insert, perfect seat geometry would result in prohibitive tooling costs. Therefore, the seat shape I use is a compromise. In lieu of changing shape with size and class, I use one design for all classes in sizes 24″ through 42″, and one other shape for all classes in sizes 48″ through 72″. In the smaller valves, surface 48 has a conical angle of 9° 2′, and in the larger valves the angle is 9° 30′. With this technique, acceptable performance over the whole range of classes and sizes can be realized merely by varying the axial spacing between the trunnion axis and the center plane 29 of the seat, and only two different sets of seat-forming rollers need be provided.

In the case of large valves, i.e., those having diameters between 48″ and 72″, I also prefer to use the slightly different seat insert design shown in FIG. 3A. Here, the seat-receiving portion 28a of the valve body is provided with an annular, central recess 54 whose bottom or outer wall is cylindrical, and which is bounded by the pair of annular shoulders 35a and 36a. The modified seat insert 22a includes a central, annular tongue which fills recess 54 and which defines the two portions 41a and 42a which cooperate with the annular shoulders to key the insert against axial displacement. The tongue is under substantial compressive loading in the axial as well as the circumferential direction, and this affords a more secure lock for the insert. This obviously is desirable in large valves where the hydraulic loads are correspondingly great. Except for the differences just mentioned, the seat and seat-receiving portion of FIG. 3A are essentially the same as their counterparts in FIG. 3. Of course, dimenions and proportions are necessarily somewhat different.

(B) The machine

The seat insert 22 or 22a is formed and finished by a cold working process in which a seat ring 20 of rectangular cross section is expanded into place on the seat-receiving portion 28 of the valve body. This process is carried out with the aid of the machine shown in FIGS. 4–11. As shown in these illustrations, the machine comprises a horizontal base 101 adapted to rest on the plant floor and composed of two steel channels 102 and 103 welded together to form a T and to which are welded three upright tubular steel columns 104–106 and a socket member 107. Fixed in the socket member 107 is a vertical, stationary shaft 108 on which is mounted rotary supporting means 109. Columns 104–106 carry a horizontal, T-shaped work bed 111 comprising a pair of continuous steel channels 112 and 113 which are welded together, and three T-slotted rails 114–116 which are attached to the channels. These rails are arranged substantially equiangularly about the axis of shaft 108, and serve to support the valve bodies 21 during the seat-rolling operation. The rails are provided with identical series of locating holes 117 positioned at different radii from the axis of shaft 108; the holes 117 being adapted to receive locating pins 118 which bear against a machined cylindrical surface 118a on each valve body and center the body with respect to the shaft axis. The machine is designed to handle nine body sizes (i.e., those having diameters of 24", 30", 36", 42", 48", 54", 60", 66" and 72") so there are nine locating holes 117 in each rail. The work bed 111 must support weights of several tons when the largest bodies are being lined, and it is essential that the upper surfaces of the rails 114, 115 and 116 always remain in a plane normal to the axis of shaft 108 during the seat-forming operation. These strength and rigidity requirements can be satisfied more easily by the illustrated T-shaped structure 111 than by one employing three separate beams spaced apart 120° and welded together at the center.

The rotary supporting means 109 comprises a support spindle 119 which encircles shaft 108, a coaxial drive spindle 121, and a carrier plate 122 bolted to a flange at the upper end of spindle 119. Support spindle 119 is supported for rotation about the axis of shaft 108, and for longitudinal movement relatively to the shaft, by a pair of radial bearings 123 and 124 and a thrust bearing 125, the thrust bearing reacting against an adjustable thrust-transmitting member 126 threaded into a bonnet 127 bolted to the spindle 119. Inclusion of adjustable member 126 is necessary in order to permit centering of the forming rolls (described below) with respect to the seat-receiving portions 28 of the various different sizes of bodies which are to be lined. Drive spindle 121 is supported for rotation about the axis of shaft 108 by thrust and radial bearings 128 and 129, respectively, and is connected in driving relation with spindle 119 through a pair of keys 131 and 132 received in complementary longitudinal grooves formed in the two spindles. Spindle 121 is driven by a variable speed drive 133 through chain 134 and sprocket 135.

Figure 6:
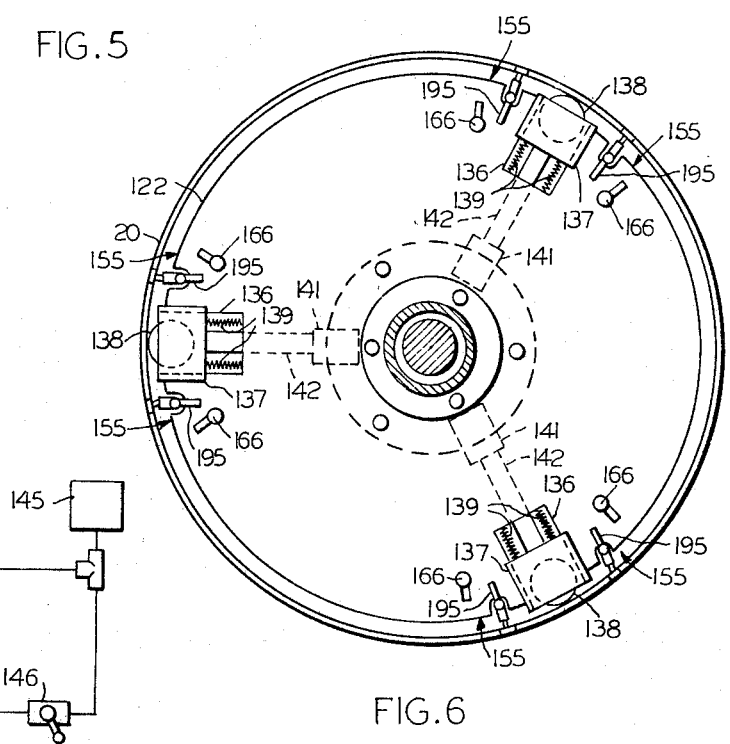
Figure 7:
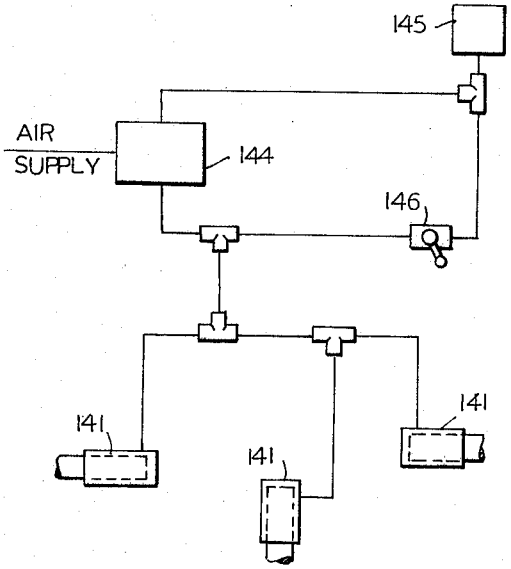
FIG. 7 is a schematic diagram of the hydraulic circuit used on the machine.
Figure 8:
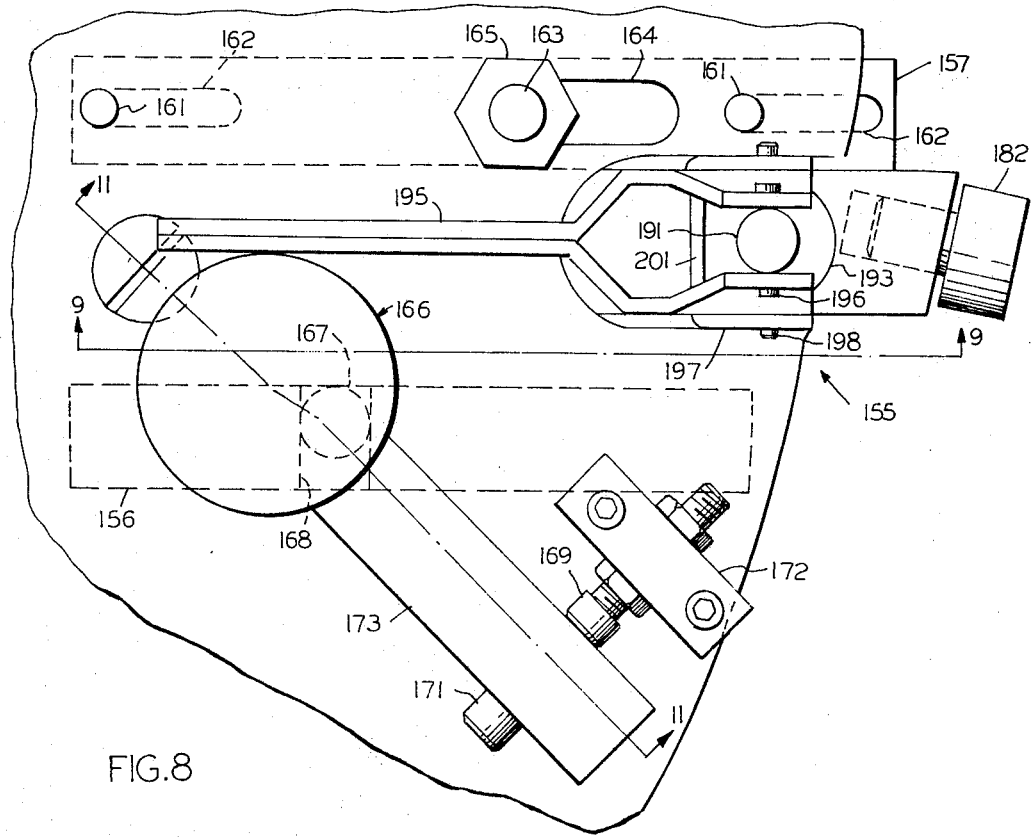
FIG. 8 is an enlarged plan view of a portion of the support plate in the region of one of the guide roll assemblies.
Figure 11:
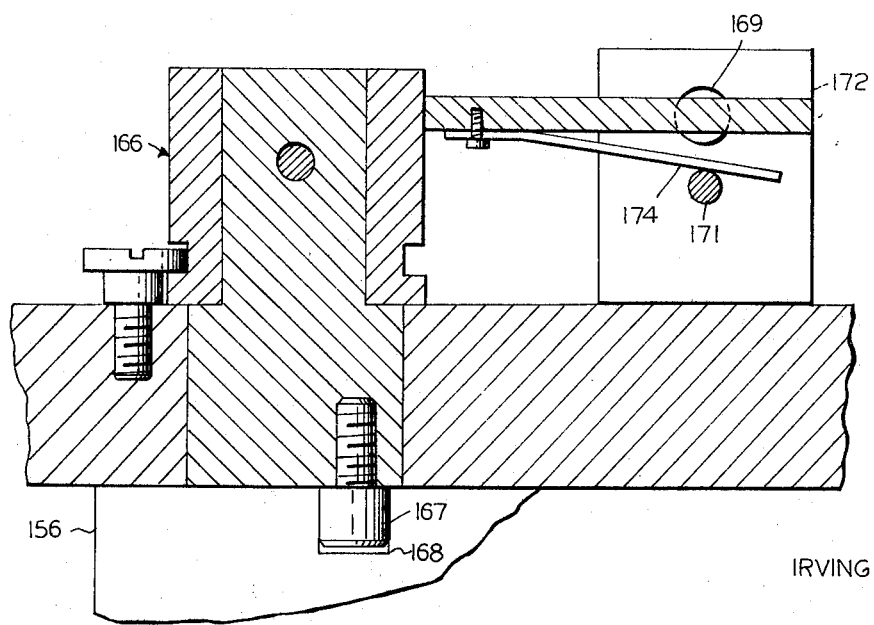
FIG. 11 is a sectional view taken on line 11—11 of FIG. 8.
Figure 9:
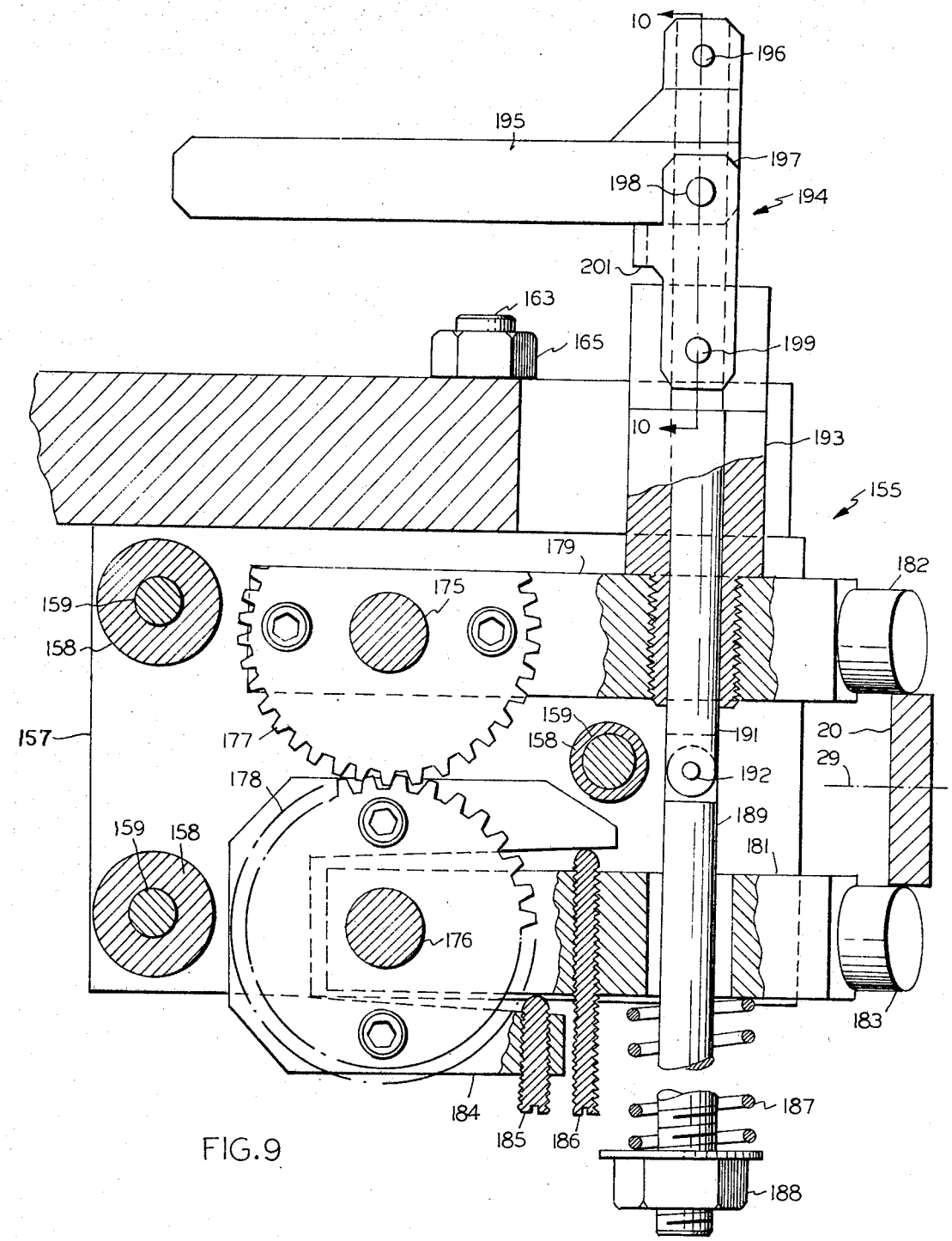
FIG. 9 is a sectional view taken on line 9—9 of FIG. 8.

As shown in FIG. 6, carrier plate 122 is formed with three uniformly, circumferentially spaced radial slots 136 in each of which is mounted a reciprocable carrier 137 containing a forming roller 138. The edges of slots 136 are received in grooves formed in the sides of carriers 137 and thus serve as guides for the carriers. Forming rollers 138 are shaped to produce one of the seats shown in FIGS. 3 and 3A, and are journaled in their carriers 137 for rotation about vertical axes. The working surfaces of the rollers 138 are lubricated during operation by oilers 137a mounted on the tops of carriers 137. Each carrier 137 is biased radially inward in its slot 136 by a pair of coil springs 139 and is forced outward during the forming operation by a single-acting hydraulic ram 141 attached to spindle 119. Spacers 142, supported by guides 143 attached to the under side of plate 122, are interposed between the rams 141 and carriers 137. Although each of the rams 141 has a nominal effective area of about 5 square inches and all three are subjected to the same pressure, the forces they exert are not exactly equal because of manufacturing tolerances. Therefore, even though the rams are spaced uniformly around the axis of shaft 108, the shaft may be subjected to an unbalanced radial load. Since the shaft is slender and can be deflected by a force on the order of 100 to 200 pounds, it will be realized that the shaft can move off center during the forming operation. Although eccentricity between the shaft axis and the valve body does not change the ram forces or adversely effect the forming step per se because the forming rolls are resiliently, not rigidly, held against the seat ring, deflection of shaft 108 in the early stages of the forming operation can cause the guide rolls (which are described below) to slip off the seat ring 20 or score the valve body 21. It has been found that this deflection problem can be solved simply by reducing the force exerted by the springs 139 associated with the ram having the smallest effective area.

The rams 141 are connected in a hydraulic circuit (see FIG. 7) which includes a pump 144, an oil reservoir 145, and a shut-off valve 146. Pump 144 is an air driven, reciprocating piston pump of the type marketed by Haskel Engineering & Supply Co. of Burbank, Calif., and supplies the rams 141 with oil under a pressure which is one-hundred times the pressure of the compressed air supplied to it. Valve 146 has two positions in which, respectively, it opens and closes a connection between the rams 141 and reservoir 145. All of the components and pipes of the hydraulic system are carried by, and thus rotate with, supporting means 109; therefore, no rotary, high pressure hydraulic seals are needed. The driving air for pump 144 is supplied by a stationary source of compressed air 147 (see FIG. 4) through a path including pipe 148, vent valve 148a, axial and radial passages 149 and 151, respectively, formed in shaft 108, the annular space 152 between this shaft and support spindle 119, and a radial passage 153 formed in the spindle. The ends of space 152 are sealed by appropriate low pressure rotary seals, represented in FIG. 4 by O-rings 154. Source 147 supplies air at a pressure of 100 p.s.i., but this level is reduced as required for the forming operation by a manually adjustable regulator 154 interposed in line 148. A gauge 154a measures the pressure at which air is delivered to hydraulic pump 144. Vent valve 148a is adapted to selectively connect the downstream portion of pipe 148 with source 147 or the atmosphere, and thus serves as a convenient means of energizing and de-energizing pump 144.

Experience with the forming machine has shown that the ring blank 20 from which the seat insert 22 is formed will not inherently remain centered with respect to the seat-receiving portion 28 of the valve body as it is rolled. Therefore, it is necessary to include some mechanism for providing a centering bias, without prohibiting axial extrusion, until deforamtion of the ring has proceeded far enough to make the seat self-retaining. This mechanism takes the form of six sets of guide roll assemblies 155 which are carried by plate 122, and which are arranged so that they grip the seat ring 20 adjacent and at opposite sides of each forming roller 138. Referring to FIGS. 8–11, each guide roll assembly 155 comprises a pair of spaced support plates 156 and 157 which are held tightly against the opposite ends of three tubular spacers 158 by a corresponding number of bolts 159 which pass through the spacers and the plates. Assembly 155 is guided for movement relatively to carrier plate 122 in a generally radial direction with respect to the avis of shaft 108 by a pair of depending guide pins 161 fixed to the carrier plate and extending into slots 162 formed in the upper surface of support plate 157. The assembly is attached to carrier plate 122 and clamped in the desired position by a stud 163 which is carried by plate 157 and projects upward through a slot 164 in the carrier plate, and by a nut 165 which bears against the upper face of the carrier plate. Reciprocation of the guide roll assembly is effected through a rotary actuator 166 which is journaled in carrier plate 122 and carries an eccentric screw 167 that rides in a cross slot 168 formed in the upper surface of support plate 156. Outward movement of assembly 155 is limited by an adjustable stop consisting of a pair of bolts 169 and 171 carried by bracket 172 bolted to the carrier plate; the head of bolt 169 being positioned to abut the handle 173 of actuator 166, and the head of bolt 171 being positioned to catch the edge of a leaf spring keeper 174 attached to the underside of the handle.

Extending between and supported by plates 156 and 157 is a pair of horizontal shafts 175 and 176 on which are journaled a pair of meshing gears 177 and 178, and a pair of arms 179 and 181. At their outer ends, the arms 179 and 181 carry guide rollers 182 and 183 which are adapted to bear against the upper and lower end faces of the seat ring 20, and which are mounted to rotate about horizontal axes that intersect the axis of shaft 108. Arm 179 is bolted directly to gear 177, but arm 181 is connected with gear 178 through an adjustable linkage including a yoke 184 bolted to gear 178, and screws 185 and 186. This linkage permits the angular orientation of arm 181 relative to gear 178 to be changed, and thus affords a means of compensating for manufacturing tolerances and insuring that the guide rollers 182 and 183 will be spaced equally from the horizontal plane 29 that bisects the seat-receiving portion 28 of the valve body and the forming rollers 138.

The arms 179 and 181 of each guide roll assembly 155 are urged toward each other by a coil compression spring 187 which reacts between the lower surface of arm 181 and a seat defined by a washer resting on a nut 188 threaded onto an articulated rod 189. The rod 189 is pivotally connected to a plunger 191 and 192, and the plunger, in turn, is connected to its guide 193 through a toggle mechanism 194. This mechanism comprises a lever 195 pivotally connected to the upper end of plunger 191 by a pin 196, and an articulated, C-shaped bracket 197 which is connected to the lever and to guide 193 by pivot pins 198 and 199, respectively. Bracket 197 has a horizontal web 201 which serves as a limit stop for lever 195. When lever 195 is resting on stop 201, spring 187 is compressed, and the axis of pin 198 lies in, or slightly to the right (as viewed in FIG. 9) of the vertical plane containing the axes of pins 196 and 199. Therefore, the toggle mechanism is locked and spring 187 exerts a maximum biasing force on arms 179 and 181. This is the operative condition of the guide roll assembly. When it is desired to retract the assembly, lever 195 is pivoted in the clockwise direction to move pin 198 to the left of the plane containing the axes of pins 196 and 199 and thereby unlock the toggle. Now, plunger 191 and rod 189 are free to move downward, and spring 187 can expand. This reduces the biasing force acting on arms 179 and 181, and urging the rollers 182 and 183 against the seat ring, and permits easy retraction of the assembly 155.

The illustrated machine is designed to handle all nine valve sizes between 24" and 72" using a maximum number of common parts. Each size valve, of course, requires its own carrier plate 122 and set of spacers 142. In addition, two sets of forming rolls 138 and carriers 137, and two sets of guide roll assemblies 155 are needed, one set of each being designed for valve sizes between 24" and 42", and the other set serving all sizes between 48" and 72". All of the remaining parts of the machine serve the whole range of valve sizes.

(C) The process

The first step in the seat-forming process involves machining of the cast iron valve body 21 to produce the seat-receiving portion 28 and the cylindrical surface 118a against which the centering pins 118 will bear. Simultaneously, a strip of stainless steel, or other suitable seat material, is rolled to approximately circular shape and welded to form the seat ring 20 from which the insert is to be made. The width and thickness of the strip material carry a tolerance of ±0.005". The weld is hand trimmed to remove all bumps, and its width is filed to within ±0.005" of the average width of the remainder of the ring. The welded ring is then annealed. While the ring 20 must be small enough to fit within body 21, the tolerance on the outside diameter is liberal. A variation of 1/8" is permissible. Furthermore, the ring need not be truly circular and, in fact, if it is too exact it should be deformed to an oval shape so that it will remain in place in the body 21 by friction while the machine is being adjusted to hold it. The surface finish of the ring also is not critical; that resulting from bright annealing, or from sand blasting after annealing in cases where scale is permitted to form, being satisfactory. In the subsequent rolling step, the inner surface of the ring will be made shiny and given approximately a 6-microinch finish.

When the preliminary machining and fabricating steps are complete, the valve body 21 is placed on the T-slotted rails 114–116 of the rolling machine in a position such that the three locating pins 118 bear against the machined surface 118a. At this time, of course, the three carriers 137 and the six guide roll assemblies 155 of the machine are in their retracted positions. Next, the actuators 166 of the guide roll assemblies are rotated to shift each assembly to its extended position, and the nuts 165 are tightened to secure the assemblies in place. If any of the upper guide rolls 182 is not spaced radially from the valve body 21 by at least about 3/32", the offending assembly 155 is repositioned and an appropriate change is made in the settings of its stop bolts 169 and 171. Now, valve body 21 is secured to the rails 114–116 by clamps (not illustrated), nuts 165 are loosened and assemblies 155 retracted, and the seat ring 20 is inserted into the valve body. The arms 179 and 181 of each assembly 155 are then spread by hand—the biasing spring 187 being relaxed—and each assembly in turn is again shifted to and clamped in its extended position. As each assembly is clamped, the operator releases arms 179 and 181 and pivots lever 195 to the position illustrated in FIG. 9, thereby compressing spring 187 and causing toggle 194 to lock. If the adjusting screws 185 and 186 have not previously been set, they are adjusted so that the rollers 182 and 183 hold ring 20 centered with respect to horizontal plane 29.

Figure 12:
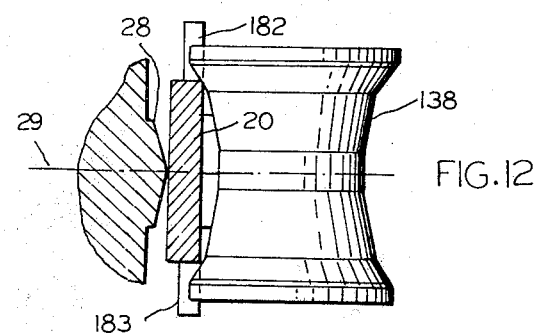
FIGS. 12–14 are sectional views through the seat-receiving portion of a valve body showing various stages of the seat-forming process.
Figure 13:
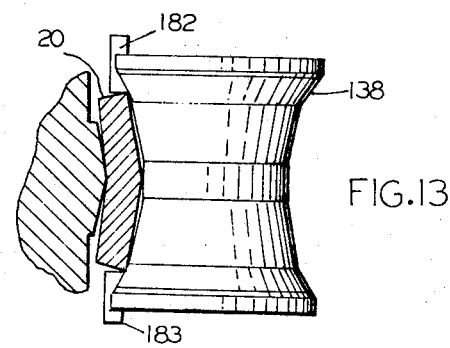
Figure 14:
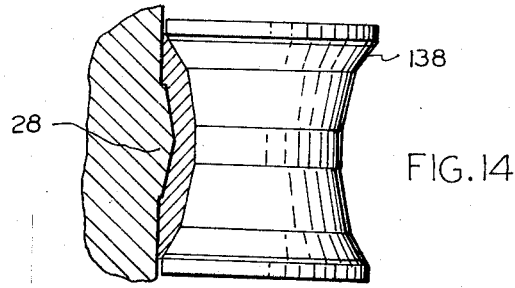
Figure 10:
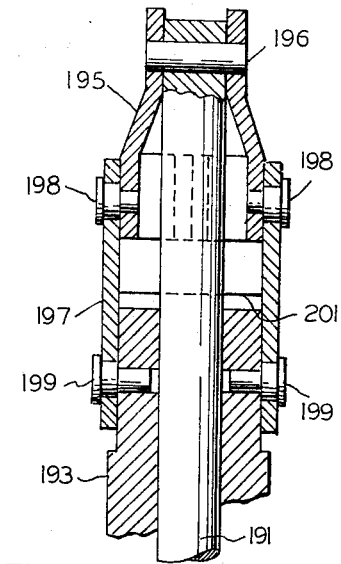
FIG. 10 is a sectional view taken on line 10—10 of FIG. 9.

The machine is now ready to commence rolling. Therefore, oilers 137a are turned on and set for a flow rate of 4 to 6 drops per minute, regulator 154 is adjusted to establish an air pressure of about 10 p.s.i., hydraulic shut-off valve 146 is closed, and vent valve 148a is shifted to a position in which pump 144 is connected with source 147. Then, variable speed drive 133 is started. The speed at which drive 133 rotates supporting means 109 is selected in accordance with the size of the valve body 21 being lined and lies between limiting values of approximately 5 and 15 R.P.M. used, respectively, for the 72" and 24" sizes. During the initial stage of the rolling operation represented in FIG. 12, the guide rolls 182 and 183 exert a bias on ring 20 which keeps it centered with respect to the plane 29 that bisects both the seat-receiving portion 28 and the forming rolls 138. After about 15 to 30 seconds, ring 20 will be so deformed and bent that it grips seat-receiving portion 28 and becomes self-retaining. This condition is represented in FIG. 13. At this point in the process, the machine is stopped, and all six guide roll assemblies 155 are retracted. The supporting means 109 is then again put in motion, and the rolling operation is continued using progressively increasing ram forces. For the smaller valves, i.e., those having diameters between 24" and 42", the air pressure supplied to pump 144 is raised to 15 p.s.i. when the machine is restarted and is subsequently increased 5 p.s.i. every 30 seconds to a maximum of 50 p.s.i. In the case of the larger valves, i.e., those between 48" and 72", the initial setting for the second stage of the rolling operation is 20 p.s.i., and the air pressure is raised 10 p.s.i. every 15 seconds to a maximum of about 90 p.s.i. The rolling process is continued until the seat ring 20 is deformed to the final shape shown in FIG. 14, and seat width may be used as an indication of this condition. For example, in the case of the smaller valves where the ring 20 is 3/16" thick and 1.194" wide, rolling is terminated when the width has increased to 1.525". The larger valves use a seat ring 20 which is 1/4" by 1.500", and these rings are worked until the width increases to about 1.865".

At the end of the rolling step, the machine is stopped, regulator 154 is set to 10 p.s.i., valve 148a is shifted to vent position, and hydraulic valve 146 is opened. Since the rams 141 are now connected with reservoir 145 and are subjected to atmospheric pressure, they retract under the action of biasing spirngs 139. Body 21 is now unclamped and hoisted from work bed 111.

The rolling operation inherently produces a seat insert 22 which is loaded in compression in the radial and circumferential directions. The compressive stresses are quite large, and this increases the corrosion resistance of the seat. In addition, the cold working of the seat ring 20 greatly increases the yield strength of the metal from which it is made. In the case of 304L stainless steel, the process raises yield strength from the annealed value of about 28,000 p.s.i. to a value exceeding 200,000 p.s.i. This characteristic enables the seat to withstand the large hydraulic and cavitation forces which can be encountered in service.

I have described herein the best mode contemplated by me for carrying out the various aspects of the invention, but it should be understood that the following claims provide the real measure of the scope of the invention.

I claim:
1. A butterfly valve characterized by
   (a) a cylindrical metal body (21) formed with an annular seat-receiving portion (28 or 28a) which includes two annular shoulders (35, 36 or 35a, 36a) which terminate at continuous sharp edges (38, 39 or 38a, 39a) that encircle the body axis, and has an inner periphery which includes two conical surfaces (31, 32 or 31a, 32a) which converge toward a plane which is normal to the body axis and is located between them; and
   (b) a cold worked metal seat ring (22 or 22a) closely fitting the seat-receiving portion and under substantial compressive loading in the radial and circumferential directions, the ends of the ring being unconfined in the axial direction and the ring having
      (1) integral keying portions (41, 42 or 41a, 42a) which cooperate with the annular shoulders to prevent axial movement of the seat ring relatively to the body,
      (2) regions (44, 45 or 44a, 45a) which are compressed tightly against said sharp edges, and
      (3) an inner peripheral surface having a short medial portion (46 or 46a) of minimum diameter which is flanked by longer conical portions (47, 49 and 48, 51 or 47a, 49a and 48a, 51a) which converge toward said plane.
2. A butterfly valve as defined in claim 1 in which
   (a) the seat-receiving portion (28 or 28a) is symmetrical with respect to said plane (29); and
   (b) the seat ring (22 or 22a) is symmetrical with respect to said plane.
3. A butterfly valve as defined in claim 2 in which the seat ring (22 or 22a) has an inner peripheral surface which includes a central cylindrical portion (46 or 46a), first conical portions (47, 48 or 47a, 48a) joined to opposite ends of the cylindrical portion and converging toward said plane, and second conical portions (49, 51 or 49a, 51a) converging in the same directions as the first such portions and joining the latter at their large diameter ends, the conical angle of the second conical portions being greater than the conical angle of the first conical portions.
4. A butterfly valve as defined in claim 1 in which the annular shoulders (35, 36) are located at the large diameter ends of said conical surfaces on the seat-receiving portions.
5. A butterfly valve as defined in claim 4 in which
   (a) the two conical surfaces (31, 32) on the seat-receiving portion at said plane (29) and define a third sharp, continuous edge (37) that encircles the axis of the body; and
   (b) the seat ring (22) also includes a region (43) which is compressed tightly against said third sharp edge.
6. A butterfly valve as defined in claim 1 in which
   (a) the shoulders (35a, 36a) are at the small diameter ends of the conical surfaces on the seat-receiving portion and are defined by an annular recess (54) in the body in the region of said plane; and
   (b) the keying portions (41a, 42a) of the seat ring (22a) are defined by an integral tongue which projects radially outward into the recess in the body.

References Cited

UNITED STATES PATENTS

| 2,121,464 | 6/1938 | Zagorski | 251—365 |
| 2,586,927 | 2/1952 | Fantz | 251—306 |
| 2,737,996 | 3/1956 | Toth. | |
| 2,791,396 | 5/1957 | Reppert | 251—306 |
| 3,275,289 | 9/1966 | Fawkes | 251—306 |

FOREIGN PATENTS

| 8,124,162 | 2/1937 | France. |
| 6,325 | 3/1912 | Great Britain. |

HENRY T. KLINKSIEK, Primary Examiner

U.S. Cl. X.R.

29—157.1, 200, 523